United States Patent [19]

Edward et al.

[11] Patent Number: 5,259,060
[45] Date of Patent: Nov. 2, 1993

[54] COATED OPTICAL FIBERS AND METHOD

[75] Inventors: John P. Edward, Corning; Robin J. MacKinnon, Horseheads, both of N.Y.

[73] Assignee: Corning Incorporated, Corning, N.Y.

[21] Appl. No.: 928,041

[22] Filed: Aug. 11, 1992

[51] Int. Cl.$^5$ .............................. G02B 6/16; G02B 6/44
[52] U.S. Cl. ................................... 385/128; 385/102; 385/141
[58] Field of Search ............... 385/100, 101, 102, 109, 385/114, 123, 126, 127, 128, 141

[56] References Cited

U.S. PATENT DOCUMENTS

| | | | |
|---|---|---|---|
| 4,407,561 | 10/1983 | Wysocki | 385/128 |
| 4,629,285 | 12/1986 | Carter et al. | 385/128 |
| 5,000,541 | 3/1991 | DeMarcello et al. | 385/128 |
| 5,074,643 | 12/1991 | Petisce | 385/128 |
| 5,146,529 | 9/1992 | Mizutani | 385/103 |

FOREIGN PATENT DOCUMENTS 0411310 2/1991 European Pat. Off. .
0432931 6/1991 European Pat. Off. .

*Primary Examiner*—Frank Gonzalez
*Attorney, Agent, or Firm*—K. van der Sterre

[57] ABSTRACT

A color-coded hermetically coated optical waveguide, consisting of glass optical fiber incorporating a light-absorbing hermetic coating but exhibiting improved color stability and differentiability, is produced by interposing a pigmented white opaque polymer coating exteriorly of the hermetic coating and interiorly of the color coding ink, the pigmented coating operating both to mask the hermetic coating and to accentuate the brightness of the ink color.

10 Claims, 1 Drawing Sheet

COATED OPTICAL FIBERS AND METHOD

BACKGROUND OF THE INVENTION

The present invention relates to coated optical fibers comprising a novel combination of coatings, and more particularly to hermetically coated optical fibers incorporating high-intensity colored coatings and offering improved color coding characteristics.

Glass optical fibers provided with hermetic coatings are well known. Typically, the hermetic coatings are metallic or carbon-based coatings which act to protect the fiber from the potentially harmful effects of water vapor or gaseous contaminants affecting optical transmission characteristics or fiber strength. U.S. Pat. Nos. 4,407,561 (Wysocki) and 5,000,541 (DiMarcello et. al.) disclose examples of hermetically coated optical fibers, and many others are known.

In optical fiber cabling containing a multiplicity of optical fibers, it is often desirable to provide the individual fibers with coatings of various distinctive colors, as is done with copper telephone cabling, in order to be able to quickly differentiate the various fibers from each other. Optical fibers supporting colored coatings for this purpose are also well known, as shown, for example, by U.S. Pat. No. 4,629,285 (Carter et al.). That patent discloses optical fibers provided with colored ink coatings, with the preferred coatings being composed of pigmented opaque UV curable polymer inks.

Published European Application EP 411,310 (Mizutani) describes optical cables containing a plurality of color-coded optical fibers, and discloses optimum proportions of pigments to be added to the polymer fiber coatings in order to achieve adequate coloration while still insuring that the coatings are curable using ultra-violet light.

It has been appreciated that optical fibers comprising hermetic coatings, in particular carbonaceous hermetic coatings, are difficult to color-code in the conventional manner. Thus U. S. Pat. No. 5,074,643 (Petisce) recognizes that conventional hermetic coatings impart a dark coloration to the fiber surface which is hard to hide, and which therefore reduces the color intensity provided by conventional colored ink formulations. The solution proposed in that patent is therefore to utilize an organic opacifying agent in combination with a non-pigment colorant, ie., an organic dye compound. The patent suggests that such organic dyes can impart adequate coloration to the fiber when employed in a suitably opacified base coating.

While specifically addressing the difficulties associated with the color coding of hermetically coated optical fibers, the approach of this latter patent does involve some disadvantages. First, it cannot employ conventional colored polymer systems already successfully developed for the color coding of standard optical fibers, but instead requires a complete reformulation of those coatings for the special case of hermetically coated fibers. This then requires that two rather than a single set of color coating formulations must be kept in inventory to handle both normal and hermetically coated fiber production.

Additional concerns which must be addressed, for these organic dye coatings as well as any other new coating system which includes previously untested organic components, include the need to qualify the optical coatings for use in optical cables under a variety of different environmental conditions. Also to be considered are issues relating to the cost, availability, and stability of the organic dye compounds. Among the known difficulties with organic dyes are limited thermal and light stability, potential "bleeding" of the color into other cable components, possible interference with curing, and a susceptibility to fading on aging.

It is therefore a principal object of the present invention to provide a color coding method for optical fibers, and particularly for hermetically coated optical fibers, which solves many of the problems posed by prior art color coding methods.

It is a further object of the invention to provide an optical fiber coating system which facilitates the color coding of hermetically coated and other fiber types with relatively intense and easily differentiable colors.

It is a further object of the invention to provide a coated and color-coded optical fiber of novel configuration, and wherein the coating system employed does not adversely affect the optical properties of the fiber to which it is applied.

It is a further object of the invention to provide a coated and color-coded optical fiber of novel configuration.

Other objects and advantages of the invention will become apparent from the following description.

SUMMARY OF THE INVENTION

The present invention solves the problem of achieving differentiable color coding in hermetically coated optical fibers in a simplified and cost effective way. An important fact underlying the invention is that, due to the size and geometry of the fibers, much of the apparent brightness or color intensity in polymer fiber coatings is derived from light which is transmitted or reflected through the polymer matrix wherein the colorant resides. This includes a substantial light component traversing the coating which would normally be reflected from the surface of the fiber itself, but for the presence of the hermetic coating thereon.

Increasing the proportion of light transmitted through the coating is achieved in accordance with the invention by minimizing or avoiding the inclusion of additional opacifying agents to the pigmented layer. Instead, we employ a white-light-reflective opacified undercoating which acts to intensify the coloring effect of the pigment present in colored overcoating layers. At the same time, the opaque undercoating tends to mask the underlying light-absorbing hermetic coating on the fiber.

In a first aspect, then, the present invention includes a color-coded hermetically coated glass optical waveguide offering substantially improved color clarity and differentiability. The hermetically coated fiber to which the color coding is applied may comprise a glass optical fiber of conventional type, the composition and relative sizes of the glass core and cladding elements being of any selected design. This fiber will incorporate a base layer or coating of any conventional hermetic type, bonded directly to the exterior glass fiber surface to protect the glass components of the fiber from environmental contaminants.

Positioned exteriorly of the hermetic coating is a cured, opaque white, liquid-applied polymer coating, typically composed of a heat curable or uv-curable polymer layer. This coating may be the first-applied or so-called "inner primary" coating on the fiber or, more preferably, the so-called "outer primary" coating. In the latter case, application of the opaque white coating is preceded by the application of a non-pigmented inner primary coating. In either case, however, the opaque white layer may advantageously be of a standard optical fiber coating polymer formulation, but modified to contain sufficient white pigment to render it highly light-reflective and substantially opaque to visible light.

Finally, positioned exteriorly of the white opaque coating and any intervening coatings on the fiber is an exterior pigmented polymer coating imparting the desired color to the surface of the coated fiber. Depending upon the application process which is selected, this coating may, for example, be a pigmented thermoplastic ink formulation or a liquid-applied heat- or radiation-curable polymer of a type similar to or compatible with the polymer used for the underlying coating. Off-line coating processes may advantageously utilize the former formulations, while on-line fiber coating procedures are best facilitated through the use of curable, liquid-applied pigmented polymer coatings.

It is a particularly advantageous feature of the coated of the invention is that the opaque light-reflective coating may be positioned at any one of several preselected locations between the pigmented color coding layer and the hermetic coating, as above described, without adversely affecting the results obtained. Thus, for example, the opaque coating may be applied as the first or so-called inner primary protective polymer coating on the fiber, in which case a soft, relatively low elastic modulus uv-curable polymer of a type customarily employed for an inner primary fiber coating will be selected as the carrier for the white pigment employed. Alternatively, the opaque coating will be a subsequently applied or secondary protective polymer coating, most preferably the so-called outer primary coating. In that event, the coating may be formed of a tougher, higher elastic modulus polymer of a type conventionally employed as the outer primary coating for the protection of the underlying fiber.

Finally, the opaque light reflective coating may be a supplemental coating, applied between the inner and outer primary coatings or over the outer primary coating as desired, with the colored coating then being applied thereover as an additional supplemental coating or as a further protective fiber coating in accordance with practice conventional for the color coding of standard optical fibers.

In a second aspect the invention comprises a method for improving the intensity of color in an hermetically coated glass optical waveguide fiber incorporating an exterior pigmented polymer layer for color coding. That method comprises the step of interposing a white opaque polymer layer between the hermetic coating and the exterior pigmented polymer layer, in order to enhance the apparent color imparted by the pigmented layer by increasing the amount of light traversing that layer.

DESCRIPTION OF THE DRAWING

The invention may be further understood by reference to the drawing wherein.

DETAILED DESCRIPTION

Figure 1:
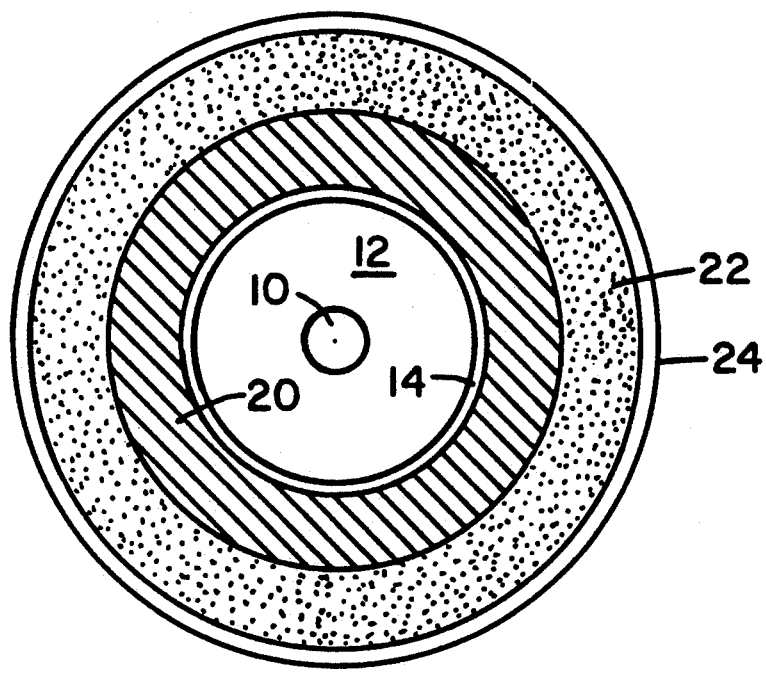
FIG. 1 is a schematic cross-sectional view of a first embodiment of a color-coded optical fiber in accordance with the invention, and FIG 2. is a schematic cross-sectional view of a second embodiment of a color-coded optical fiber in accordance with the invention.
Figure 2:
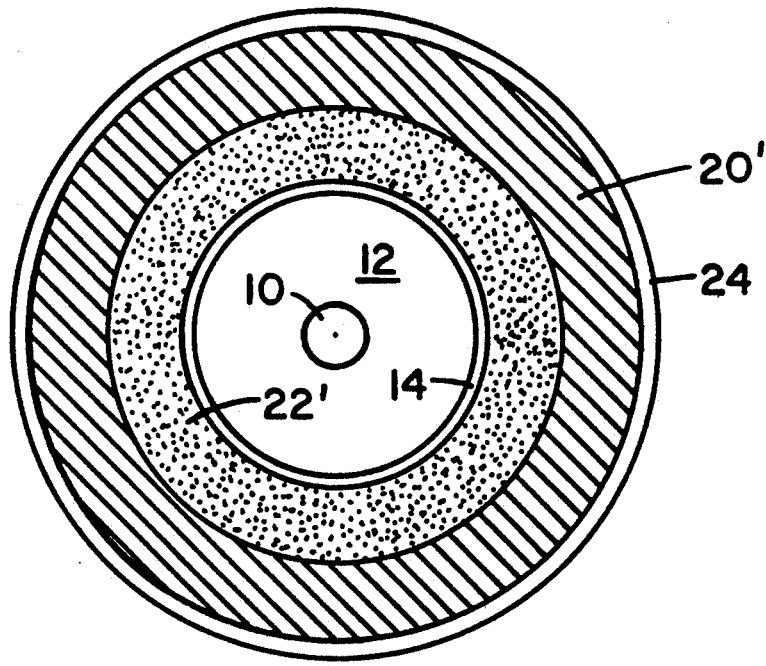

As previously indicated, optical fibers to be provided with improved color coding layers in accordance with the invention may be of essentially any glass composition and/or optical design. In FIGS. 1 and 2 of the drawing, a typical "single mode" optical fiber having a relatively small fused-silica-based core element 10 and a larger fused-silica-based cladding 12 disposed over the core is shown; nevertheless, "multi-mode" or other fiber designs of similar or different glass composition may equivalently be treated. The common feature of all of these fibers, however, is that a hermetic coating 14 will be disposed exteriorly of and bonded to the cladding layer for fiber protection.

In a particularly preferred embodiment of the invention, schematically illustrated in FIG. 1 of the drawing, the fiber includes a conventional inner primary protective polymer coating 20. This is a clear polymer coating which contains no pigment and which serves the sole purpose of protecting the fiber from physical damage and/or distortion which might cause signal strength losses in use.

Disposed exteriorly of inner primary coating 20 in FIG. 1 is a white, opaque pigmented coating 22. This coating, which can be formulated using a conventional base polymer and white pigments of known compatibility therewith, is a dual purpose coating referred to as an opaque outer primary coating. It serves not only to hide the underlying hermetic coating 14 and provide a light-reflective base for later coloring, but also to provide additional physical protection for the underlying glass fiber. Thus the physical (elastic) as well as optical properties of this coating are important Finally, the fiber in FIG. 1 is provided with a colored (pigmented) outer coating 24. This coating, typically referred to as a tertiary coating, serves the primary purpose of coloring the fiber. It may, but need not, provide any protective function, and in fact may be selected from among the known colored thermoplastic or curable liquid-applied optical fiber coating compositions. A number of compositions of this type, containing various combinations of pigments and compatible polymer bases for the pigments, have been previously developed for the color coding of standard optical fiber. Thus no special colored polymer formulations have to be provided in this design.

The color-coded optical fiber shown in FIG. 2 of the drawing employs a different layering design to achieve enhanced color. In that design, a dual purpose inner primary fiber coating 22' is used, that coating incorporating a polymer base with physical (elastic) properties appropriate for a primary protective fiber coating, but additionally containing a compatible white pigment for achieving masking of the hermetic coating and improved light reflectance from the fiber.

Positioned exteriorly of the opaque white inner primary coating 22' in FIG. 1 is a protective outer primary fiber coating 20'. That coating is most preferably a conventional liquid-applied outer primary fiber coating having physical properties appropriate for the protection of the optical fiber to which it is applied. Of course, this outer primary coating could in principle incorporate the desired pigment for color coding of the fiber, but the economics of cabling presently dictate that the various coloring layers be applied to the fibers in a separate off-line coating step. Thus the coated fiber of FIG. 2 will generally also incorporate a "tertiary" or outermost colored layer or coating 24, similar to that corresponding to coating 24 in FIG. 1 of the drawing.

The composition of the base polymers used to provide the protective and/or white opaque coatings to be applied to hermetically coated fibers in accordance with the invention is not critical. Any of the well-known curable liquid polymers known to have utility for the application of optical fiber coatings may be employed. Examples of some well-known polymer types which have previously been used for protective and/or colored optical fiber coatings include urea-acrylate, urethane-acrylate, epoxy-acrylate, polyether acrylate, polyester acrylate, urethane epoxides, silicone acrylates, and silicone polymers. Either thermally curable or radiation curable forms of these coatings may be used.

It is also possible, although not preferred, to employ thermoplastic formulations for the coating of these fibers. Examples of thermoplastics which are considered suitable for this use are polyesters, polyamides, polyvinyl chlorides and fluoropolymers.

The nature of the pigment additive used to impart opacity and high light-reflectance to the white coating layer is not critical; any of a wide variety of known white pigments including, for example, $TiO_2$, $BaSO_4$, $PbO$, $ZnO$, $PbCO_3$, $PbSO_4$, and $ZnS$, could be used. However, the presently preferred pigment additives for this purpose are highly reflective white pigments such as $TiO_2$. This pigment, in particular, not only significantly increases light reflectance from the coating, but also has high hiding power, and thus is most effective in masking the presence of the underlying hermetic coating on the fiber.

Liquid coating compositions incorporating a suitable white pigment and having coating characteristics suitable for the inner primary or outer primary coating of optical fibers are both readily formulated and commercially available. Examples of commercially available curable white acrylate coatings are white coating resin No. 3471-2-72 manufactured by DSM Desotech of Elgin, Illinois and Neorad F480 white coating resin available from ICI Chemicals and Polymers Ltd., Runcorn, Cheshire, England.

Custom formulations in these or other resin systems can conveniently be provided by simply combining the selected pigment in appropriate proportions with a curable liquid coating resin base compatible with other coating resins to be used on the fiber. For the formulation of custom coatings, it will be found that sufficient hiding power can generally be achieved with the preferred pigments without employing pigment quantities so large as to unacceptably degrade the physical properties and/or coating characteristics of the base resins. Any minor reductions in cure rate may generally be offset by small adjustments to polymer or photoinitiator composition and/or to the curing conditions employed.

For cases in which very high white pigment loadings may be desirable to achieve especially high color differentiation, coating formulations containing such loadings may be applied to the fibers as supplemental opacifying coatings instead of primary protective coatings. Hence, such coatings may be applied between the inner and outer primary protective coatings, or as supplemental layers covering the outer primary coatings, without unduly affecting the performance and effectiveness of the clear primary protective layers. For these applications, however, the use of base polymers similar in composition to those used to provide the protective coatings will again normally be preferred.

The use of similar or compatible base polymers for the opacifying layers is expected to reduce the likelihood that harmful interactions between the various coating polymers will occur. The avoidance of such interactions will insure that a well-integrated and optimally functional color coding system can be achieved.

For most applications, the use of a light-reflecting outer primary (secondary) protective coating layer, disposed on the inner primary protective fiber coating and composed of a coating polymer of the same base composition as that of the inner primary coating, constitutes a particularly preferred embodiment of the present invention. Thus, while white pigmentation of the inner primary layer is possible, such can interfere with the critical elastic and/or thermal properties of the inner primary layer, necessitating other compositional adjustments in order to compensate for the presence of the added pigment therein.

As previously noted, the opaque white primary coatings provided in accordance with the invention permit the use, without modification, of conventional colored overcoating formulations to effect color coding of the fibers. These may be applied off-line, ie., in a supplemental coating operation, or else in an on-line procedure during fiber manufacture as the final step in a multi-layer coating process. In the latter case, of course, fast-curing liquid-applied colored resins similar in base composition to the resins used for conventional protective coatings will preferably be used, but again such coating formulations are known and commercially available.

The invention may be further understood by reference to the following detailed example, which is intended to be illustrative rather than limiting.

EXAMPLE

From a glass preform positioned in a fiber drawing furnace a glass fiber is drawn downwardly through a vapor deposition chamber wherein a carbon-based hermetic coating is applied to the hot fiber by a known vapor deposition process. The hermetic coating as applied is a glossy black coating with relatively high light absorbance.

After exiting the hermetic coater the fiber is drawn through a fiber cooler and then into a liquid coater adapted to apply a curable liquid organic resin coating to the fiber. The applied coating, which is a clear coating of a uv-curable urethane-acrylate resin, is then promptly cured by transporting the coated fiber through a uv-light exposure cabinet wherein an intense uv exposure rapidly cures the applied resin to a clear, relatively soft inner primary acrylate coating. This coating has a thickness of about 40 microns and, due to the clarity of the coating, has no masking effect on the underlying hermetic fiber coating. Hence the light absorbance of the protectively coated fiber remains relatively high.

Following the application of the soft inner primary acrylate coating to the fiber, the coated fiber is next transported through another liquid coater for the application of an outer primary coating thereto. In this case, however, the coating resin which is applied to the fiber is a liquid coating resin to which a quantity of a white $TiO_2$ pigment has been added. The resin used is Coating Resin 3471-2-72 white coating resin, obtained commercially from DSM Desotech, Elgin, Illinois. The proportion of pigment in this coating formulation is of the order of 1% by weight of the overall resin composition.

Pigments of this type may be incorporated into a base resin by conventional blending steps, as for example by grinding the pigment into a resin fraction to form a concentrate, and then blending the concentrate with the base resin to achieve a pigment loading in the 0.5-5% weight range. The base resin in this case is a uv-curable urethane acrylate resin which, when cured to a polymer film, exhibits physical properties appropriate for an outer primary optical fiber protective coating.

Curing of the pigmented acrylate resin for the outer primary coating is again achieved by transporting the fiber through a uv-light exposure cabinet. Again, rapid curing of the outer primary coating to an opaque white urethane-acrylate polymer coating is achieved in this exposure.

Inspection of the coated fiber following the application of the two protective coatings indicates that a durable, white opaque protective coating on the fiber has been obtained. The coating system provides all of the protective characteristics of a standard inner primary/outer primary acrylate coating system of similar composition, and in addition provides very efficient masking of the underlying black hermetic coating. The white outer primary thus provides a highly light-reflective base for the application of subsequent coloring layers.

Following application of the protective coating system the fiber is collected on a spool and processed through an off-line coating station for the purpose of applying a colored overcoating to the outer surfaces of the fiber, in this case a yellow coating although any other color may be employed. To apply this coating, the fiber is continually transported past an ink applicator adapted to apply a radiation curable colored ink to the pre-coated fiber. In this example, the ink is a yellow Series 3287-10 uv-curable acrylate overcoating resin commercially obtained from DSM Desotech of Elgin, Illinois. Of course, other known ink compositions, including thermoplastic, solvent-based, and heat curable overcoating compositions, could also be employed for this step of the process. Most importantly, the use of specially formulated dye-based coloring preparations, while permitted, is not required.

Inspection of the coated fiber after the application of the yellow ink layer to the white opaque outer primary coating indicates that a color intensity much greater than observed in a hermetically coated fiber comprising only clear protective coatings has been achieved. The color intensity observed for this particular yellow overcoating is in fact equal or superior to the intensity normally achieved in clear-coated conventional fibers, due to the highly light-reflective characteristics of the opaque white outer primary coating. And, while not all colors show this intensification effect, other colors provided by this procedure, including red, green, blue and purple inks, were found to be both thermally stable and easily differentiable from other colors under typical field lighting conditions.

Of course, the foregoing Example is merely illustrative of procedures and materials provided by the present invention, and it will be apparent from the foregoing description as a whole that numerous modifications and variations upon the practices herein disclosed may be resorted to by those skilled in the art within the scope of the appended claims.

We claim:

1. A color-coded hermetically coated glass optical waveguide fiber comprising:

a glass optical fiber;
   an interior hermetic coating bonded to the surface of the glass fiber;
   a pigmented white opaque polymer coating positioned exteriorly of the hermetic coating; and
   an outer pigmented colored coating positioned exteriorly of the pigmented white opaque polymer coating, wherein the white opaque polymer coating is a low elastic modulus inner primary coating bonded directly to the hermetic coating.

2. A color-coded hermetically coated glass optical waveguide fiber comprising:

a glass optical fiber;
   an interior hermetic coating bonded to the surface of the glass fiber;
   a pigmented white opaque polymer coating positioned exteriorly of the hermetic coating; and
   an outer pigmented colored coating positioned exteriorly of the pigmented white opaque polymer coating,
   wherein the white opaque polymer coating is a high elastic modulus outer primary coating, and wherein a low elastic modulus inner primary coating is positioned between the white opaque polymer coating and the hermetic coating.

3. A color-coded optical waveguide fiber in accordance with claim 2 wherein the white opaque polymer coating is formed of a polymer selected from the group consisting of acrylate, epoxy acrylate, urethane acrylate, and silicone polymers.

4. A color-coded optical waveguide fiber in accordance with claim 3 wherein the white opaque polymer coating is formed of a uv-cured urethane acrylate polymer.

5. A color-coded optical waveguide fiber in accordance with claim 3 wherein the white opaque polymer coating contains a white pigment selected from the group consisting of $TiO_2$, $BaSO_4$, $PbO$, $ZnO$, $PbCO_3$, $PbSO_4$, and $ZnS$.

6. A color-coded optical waveguide fiber in accordance with claim 5 wherein the white pigment is $TiO_2$.

7. In a color-coded hermetically coated glass optical waveguide fiber comprising a glass optical fiber with a hermetic coating bonded directly to the surface thereof and an exterior pigmented overcoating for color coding, the improvement wherein a pigmented white opaque polymer coating is positioned interiorly of the pigmented overcoating and at a location effective to increase light transmittance or reflectance through the exterior pigmented overcoating.

8. A method for improving color intensity in an hermetically coated glass optical waveguide fiber incorporating an exterior pigmented overcoating for color coding which comprises the step of interposing a white opaque polymer layer as an outer primary coating between the hermetic coating and the exterior pigmented overcoating.

9. A method in accordance with claim 8 wherein the white opaque polymer layer comprises a high-hiding light-reflecting white pigment selected from the group consisting of $TiO_2$, $BaSO_4$, $PbO$, $ZnO$, $PbCO_3$, $PbSO_4$, and $ZnS$.

10. A method in accordance with claim 9 wherein the white opaque polymer layer is a protective coating formed of a polymer selected from the group consisting of acrylate, epoxy acrylate, urethane acrylate, and silicone polymers.

* * * * *